(12) United States Patent
Downes et al.

(10) Patent No.: US 6,997,285 B2
(45) Date of Patent: Feb. 14, 2006

(54) SHAFT SEAL WITH LUBRICATION DEVICE

(75) Inventors: Michael D. Downes, Woodinville, WA (US); Robert P. LaPlante, Gilford, NH (US)

(73) Assignee: Freudenberg-NOK General Partnership, Plymouth, MI (US)

( * ) Notice: Subject to any disclaimer, the term of this patent is extended or adjusted under 35 U.S.C. 154(b) by 0 days.

(21) Appl. No.: 10/150,886

(22) Filed: May 16, 2002

(65) Prior Publication Data

US 2003/0019692 A1    Jan. 30, 2003

Related U.S. Application Data

(60) Provisional application No. 60/291,295, filed on May 16, 2001, provisional application No. 60/351,560, filed on Jan. 24, 2002.

(51) Int. Cl.
    *F16N 7/12*    (2006.01)
(52) U.S. Cl. ................ 184/19; 184/105.3; 188/322.17; 384/469
(58) Field of Classification Search ............... 184/19, 184/18, 14, 105.3; 277/549, 562, 568, 550, 277/934; 188/322.17; 384/469
    See application file for complete search history.

(56) References Cited

U.S. PATENT DOCUMENTS

| 4,493,490 | A | * | 1/1985 | Ohma ........................ 280/276 |
| 5,906,047 | A | * | 5/1999 | Miller et al. ........... 29/890.132 |
| 5,913,548 | A | * | 6/1999 | Keck ........................... 29/596 |
| 6,004,039 | A |   | 12/1999 | Yabe et al. |
| 6,035,969 | A | * | 3/2000 | Pyle ........................ 184/105.3 |
| 6,328,292 | B1 | * | 12/2001 | Jarstad .................... 267/64.21 |
| 2003/0011134 | A1 | * | 1/2003 | Frauhammer et al. ...... 277/390 |

* cited by examiner

*Primary Examiner*—David Fenstermacher

(74) *Attorney, Agent, or Firm*—Ronald W. Wangerow; Harness, Dickey & Pierce, P.L.C.

(57) ABSTRACT

A shaft seal assembly for use with a reciprocating or rotating shaft includes a shaft seal, a lubricant-storing ring, and a retainer. The retainer and ring can be formed as a subassembly and then combined with a shaft seal. The assembly provides a lubricated shaft and seal that improves the effective life of the shaft seal.

19 Claims, 4 Drawing Sheets

SHAFT SEAL WITH LUBRICATION DEVICE

CROSS REFERENCE TO RELATED APPLICATIONS

This claims the benefit of U.S. provisional patent applications identified as Application No. 60/291,295, filed May 16, 2001, and Application No. 60/351,560, filed Jan. 24, 2002.

BACKGROUND OF THE INVENTION

This invention relates in general to seals for reciprocating and rotating shafts. In particular, this invention relates to a shaft seal having a lubricant-storing ring and a device for delivering lubricant to the ring.

Seals for use with reciprocating or rotating shafts are susceptible to debris and contaminants. The accumulation of debris at an outer portion of a seal can damage a seal and reduce its effective life.

A suspension fork is oftentimes used on a motorcycle or a mountain bicycle. A shaft is permitted to reciprocate with respect to the fork to absorb road inputs. A seal is provided at the outer boundary of the suspension fork that retains lubricant within the fork and permits the shaft to reciprocate. The environment for such seals is usually not well lubricated, thus reducing the effective life of the seals.

SUMMARY OF THE INVENTION

The present invention includes a seal for use with a reciprocating or rotating shaft. The seal can be used on a suspension fork of a motorcycle, a mountain bike, or other systems with dynamic components requiring sealing. The seal includes a lubrication device that improves the effective life of the seal. The seal also includes an external lip for preventing the accumulation of debris.

In a preferred embodiment, a shaft seal assembly for use with a reciprocating or rotating shaft includes a shaft seal, a lubricant-storing ring, and a retainer. The retainer and ring can be formed as a subassembly and then combined with a shaft seal. The assembly provides a lubricated shaft and seal that improves performance and the effective life of the shaft seal.

DETAILED DESCRIPTION OF THE INVENTION

Figure 1:
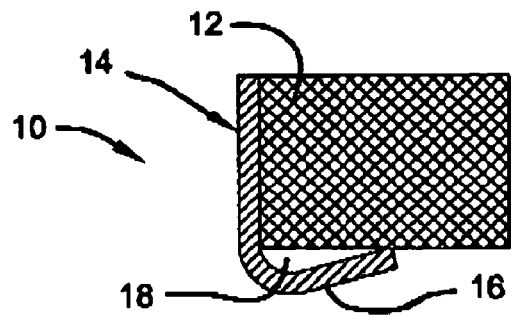
FIG. 1 is a sectional view of a portion of a ring and retaining clip subassembly according to this invention.
Figure 2:
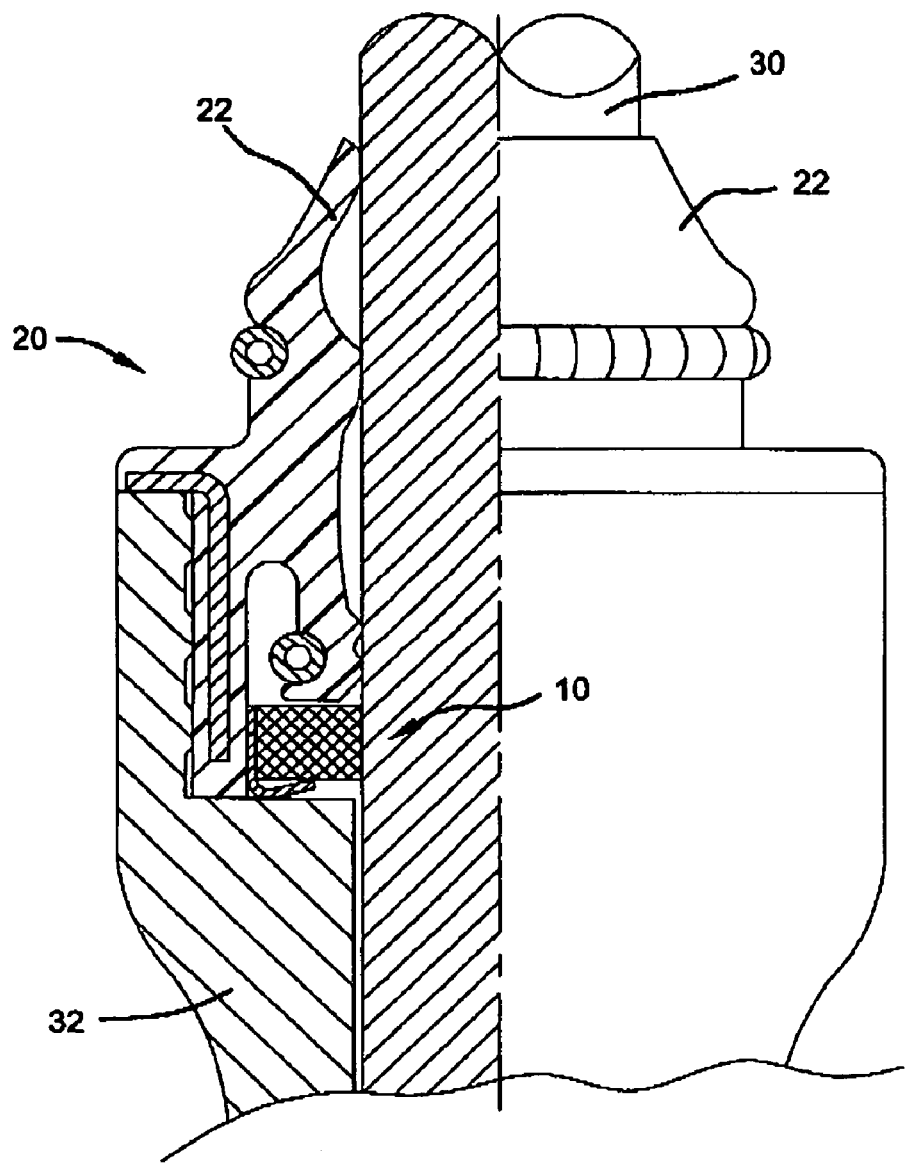
FIG. 2 is a partially sectional view of a shaft seal incorporating the ring and clip subassembly of FIG. 1, wherein the shaft seal is mounted on a reciprocating shaft, and the shaft seal and subassembly are illustrated in their pre-flexed positions on the left side of the drawing.

A ring and retaining clip subassembly 10 is illustrated in FIG. 1. The subassembly 10 is particularly intended to be used with a shaft seal 20, as indicated in FIG. 2.

The subassembly 10 includes a lubricating ring 12 and a retaining clip 14. The lubricating ring 12 absorbs and retains a lubricant or oil that is adjacent the shaft seal 20. Lubricant from the lubricating ring 12 allows the shaft seal 20 to operate in non-lubricated (dry) and/or poorly lubricated environments without generating high sealing lip breakaway, dynamic friction, temperature, squeaking, and wear that could otherwise occur.

The lubricating ring 12 can be formed from any desired material that wicks-up and retains oil or other lubricating fluids. An inner diameter of the lubricating ring 12 is preferably an interference fit (and may range to a clearance fit) with a mating shaft 30, so that lubricant is imparted to the shaft 30. The shaft 30 can reciprocate and/or rotate within a housing 32. An outer diameter of the lubricating ring 12 is preferably an interference fit with the retaining clip 14 to provide radial location. Physical characteristics of the lubricating ring 12, such as inner diameter/outer diameter concentricity, interference levels, thickness and geometer, are preferably sized to optimize the retention and delivery of lubricant.

The retaining clip 14 can be formed from any desired material that offers sufficient rigidity to retain and locate the retaining clip 14 to the shaft seal 20. The retaining clip 14 may include a first arm 16 that is bent over the lubricating ring 12 in such a manner that a cavity or void 18 is formed between the arm 16 and the lubricating ring 12. The cavity 18 forms a reservoir for oil that is in fluid communication with the lubricating ring 12. The retaining clip 14 can incorporate various features such as undercuts, snap together features, etc. to provide desired axial and radial positioning.

The shaft seal 20 also includes a sealing lip 22 that sweeps away debris and prevents the accumulation of contaminants. The sealing lip 22 is angled slightly outward away from the shaft seal 20 to eliminate a void that could act as a depository for debris. The sealing lip 22 can deflect and follow motions of the shaft 30, and continue to maintain its seal against the shaft 30.

The ring and retaining clip subassembly 10 provides localized lubrication for an area that is typically without lubricant or only marginally lubricated, thus enhancing the sealing functions and service life of the shaft seal 20. Improvements in breakaway and dynamic friction are provided by the subassembly 10, as well as reductions in noise and wear associated with non-lubricated ("dry") and/or inconsistently lubricated environments. The subassembly 10 also prevents contamination or debris from collecting adjacent to the seal 20.

Figure 3:
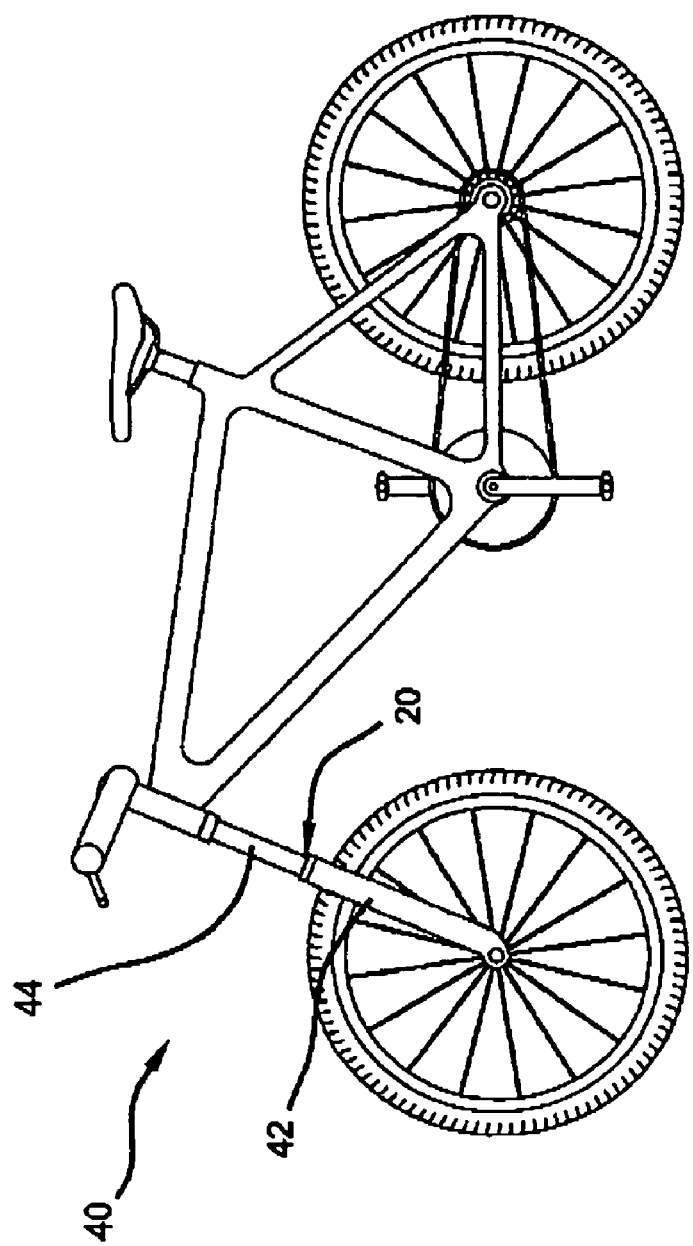
FIG. 3 is a plan view of a mountain bike having a suspension fork with the shaft seal of FIG. 2.

A bicycle, such as a mountain bike, is indicated at 40 in FIG. 3. The bike 40 includes a suspension fork 42 that receives a reciprocating shaft 44. The shaft seal 20 incorporating the subassembly 10 is used with the suspension fork 42 to retain lubricant for the shaft 44.

Figure 4:
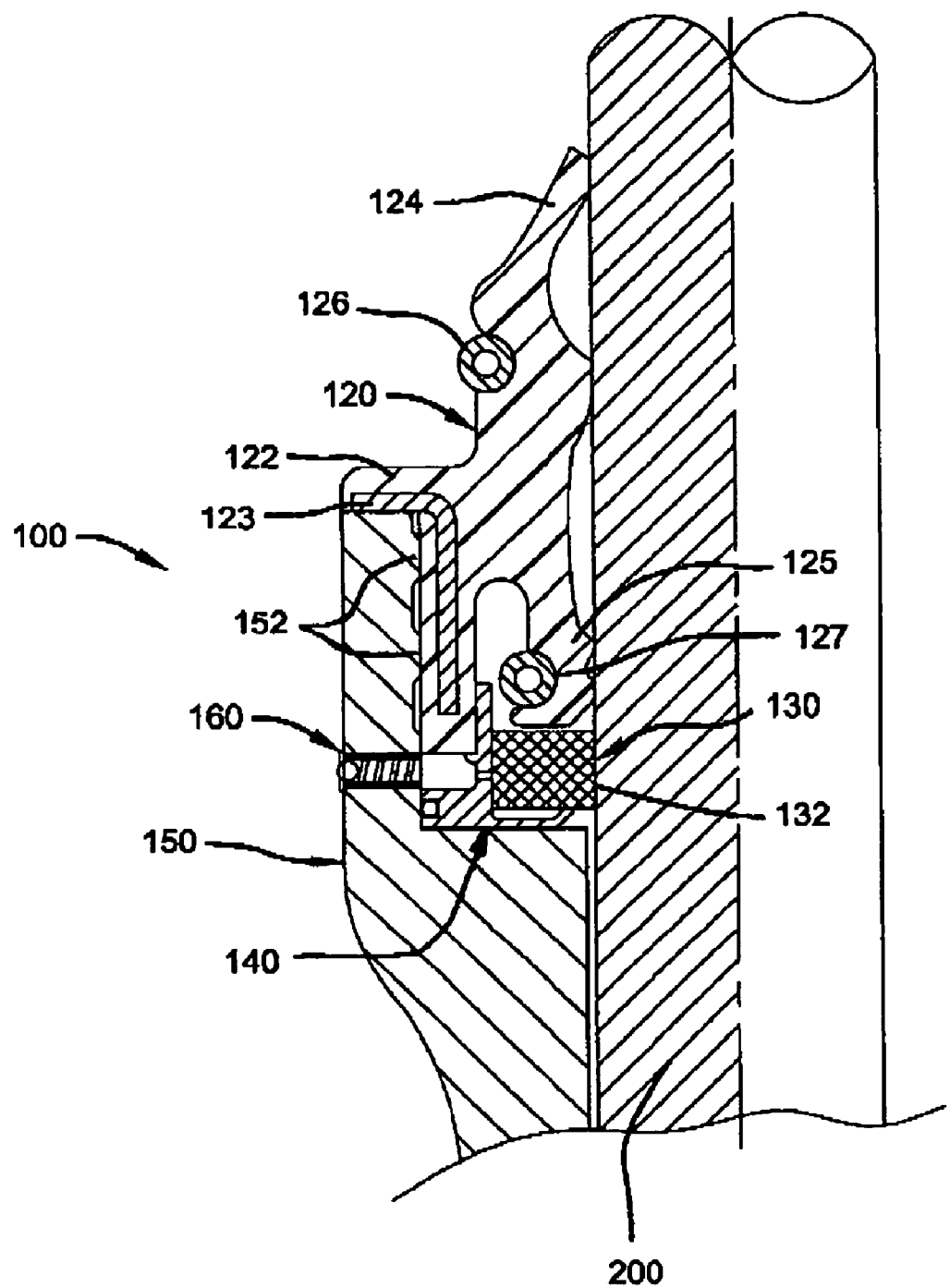
FIG. 4 is a sectional view of a portion of a second embodiment of a shaft seal assembly according to this invention mounted on a reciprocating or rotating shaft.
Figure 5:
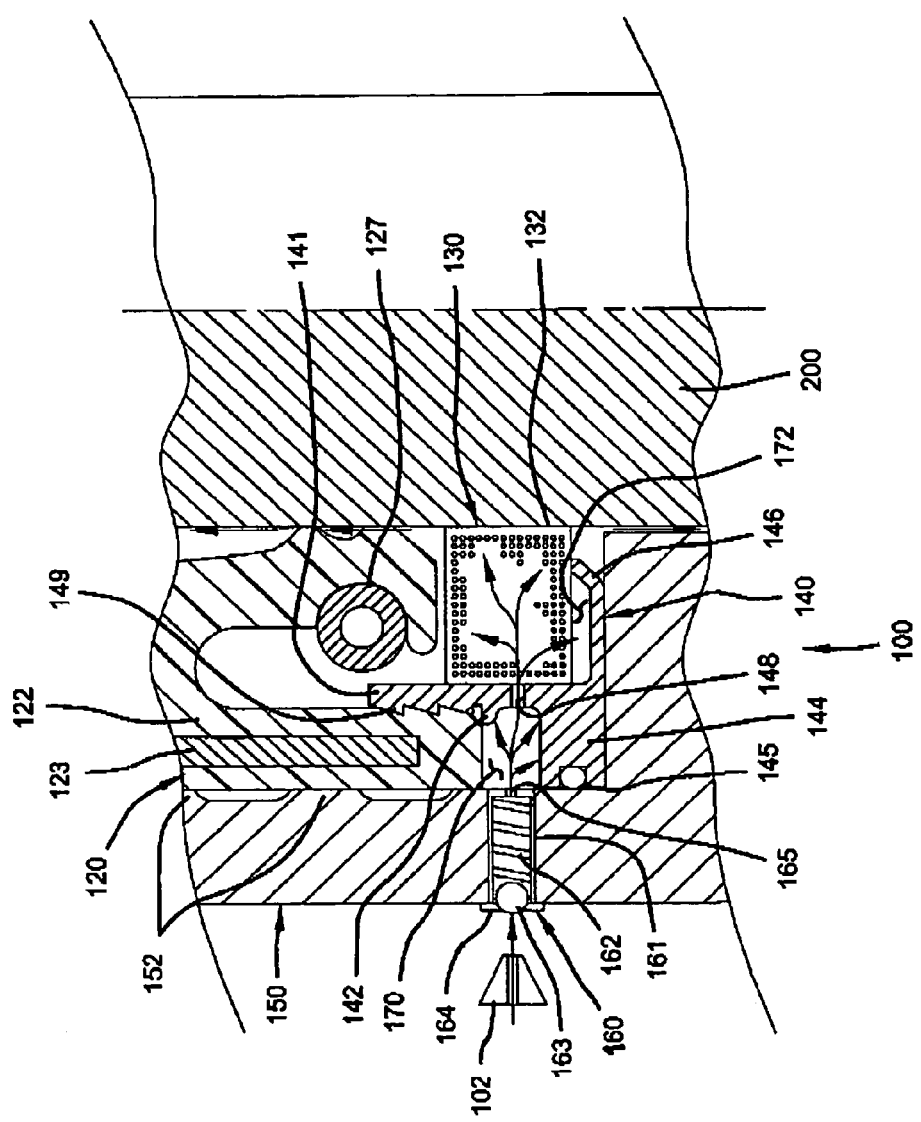
FIG. 5 is an enlarged portion of the shaft seal assembly of FIG. 4 wherein arrows indicate the path of lubricant through the shaft seal assembly.

A second embodiment of a lubricating shaft seal assembly, indicated generally at 100, is illustrated in FIGS. 4 and 5. The seal assembly 100 is particularly designed for use with a reciprocating or rotating shaft 200.

The shaft seal assembly 100 includes a shaft seal 120, a lubricant-storing ring 130, a retainer 140, a housing 150, and an injector valve 160.

The shaft seal 120 includes an elastomeric material 122 formed onto an insert 123. The elastomeric material 122 includes a first engagement portion 124 and a second engagement portion 125 that are in contact with the shaft 200. Springs 126 and 127 can be used to enhance the preload or engagement of the shaft seal 120 onto the shaft 200.

The lubricant-storing ring 130 can be formed from any desired material that wicks-up and retains lubricant, such as foam. Preferably, the ring 130 is formed an as annular member (in one or more pieces) than has an inner circumferential surface 132 in contact with the shaft 200.

The retainer 140 preferably includes an annular wall 141 (see FIG. 2) having a first outer flange 142, a second outer flange 144, an inwardly projecting skirt 146, and a port 148. The first outer flange 142 engages the shaft seal 120. The second outer flange 144 can terminate in a seal 145 such as an O-ring. The skirt 146 engages and supports the ring 130. The port 148 can be formed between the first flange 142 and the second flange 144. Ribs 149 can also be formed on the wall 141 for engagement with the shaft seal 120.

The annular housing 150 is fitted about a portion of the shaft seal 120 and the retainer 140. Elements such as ribs 152 can be formed on the housing 150 for engagement with the shaft seal 120 and vise versa. The seal 145 of the retainer 140 engages the housing 150.

The injector valve 160 can be formed as a ball check valve having a casing 161, a spring 162, a ball 163, and an end stop 164. The injector valve 160 is preferably press-fit into an opening formed in the housing 150.

A first reservoir 170 is bounded by the housing 150, the shaft seal 120, and the retainer 140. Lubricant is injected into the injector valve 160 by any desired means, including an injector 102. The ball 163 is moved away from the end stop 164 so that fluid can pass through a port(s) 165 in the casing 161 to the reservoir 170.

Fluid in the reservoir 170 travels through port(s) 148 in the retainer 140 to the ring 130. The ring 130 includes internal cavities or pockets that receive and store lubricant. Excess fluid is stored in a second reservoir 172 bounded by the ring 130 and the skirt 146 of the retainer 140.

The reservoirs 170 and 172 provide storage of lubricant. This lubricant ensures the saturation of the ring 130, which in turns lubricants the shaft 200 and shaft seal 120.

The shaft seal assembly 100 provides localized lubrication for an area that is typically only marginally lubricated or completely void of lubrication. This localized lubrication enhances the sealing functions and service life of the shaft seal 120. The shaft seal 120 operates in a consistently lubricated environment, resulting in low sealing lip break-away and dynamic friction, low operational temperature generation, low sealing lip wear, and reduced occurrence of seal "squeak," which is typical of non-lubricated (dry) and/or inconsistently lubricated environments.

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope.

What is claimed is:

1. A shaft seal assembly for a slidable shaft disposed in a bore in a housing, said assembly comprising:
   a shaft seal;
   a lubricant-absorbing ring disposed adjacent to said shaft seal; and
   a retainer disposed adjacent to said lubricant-absorbing ring and retaining said shaft seal and said lubricant-absorbing ring within the bore in the housing, said retainer defining a reservoir adjacent to said lubricant-absorbing ring.

2. The shaft seal assembly specified in claim 1 including means for delivering lubricant to the ring.

3. The shaft seal assembly specified in claim 2 wherein the means or delivering lubricant to the ring include an injector valve.

4. The shaft seal assembly specified in claim 3 wherein the injector valve is mounted on the housing.

5. The shaft seal assembly specified in claim 1 wherein the reservoir is bounded by the ring and retainer.

6. The shaft seal assembly specified in claim 1 wherein said shaft seal is disposed in a housing of a suspension fork.

7. The shaft seal assembly specified in claim 1 wherein the shaft seal includes an outwardly extending lip that follows the shaft and prevents the accumulation of debris.

8. A shaft seal assembly comprising:
   a housing;
   a movable shaft disposed in said housing;
   a shaft seal disposed between said housing and said shaft;
   a lubricant-absorbing ring adjacent to said shaft seal;
   a lubricant injection fitting in said housing for delivering lubricant to the ring; and
   a reservoir disposed adjacent to said lubricant-absorbing ring.

9. The shaft seal assembly specified in claim 8 wherein the lubricant injection fitting includes an injector valve.

10. The shaft seal assembly specified in claim 8 wherein the reservoir is bounded by the ring and a retainer.

11. The shalt seal assembly specified in claim 8 wherein the housing is a suspension fork.

12. The shaft seal assembly specified in claim 8 wherein the shaft seal includes an outwardly extending lip that follows the shaft and prevents the accumulation of debris.

13. A shaft seal assembly comprising:
   a housing;
   a shaft movably disposed in said housing;
   a shaft seal disposed between said housing and said shaft;
   a lubricant-absorbing ring adjacent to said shaft seal; and
   a rigid retainer retained to said shaft seal by an interference fit and supporting said lubricant-absorbing ring wherein said lubricant-absorbing ring is disposed axially between said shaft seal and said retainer.

14. The shaft seat assembly specified in claim 13 including a lubricant injection fitting in the housing for delivering lubricant to the ring.

15. The shaft seal assembly specified in claim 14 wherein the lubricant injection fitting includes an injector valve.

16. The shaft seal assembly specified in claim 13 wherein said retainer defines a reservoir adjacent to said lubricant-absorbing ring.

17. The shaft seal assembly specified in claim 13 wherein the housing is a suspension fork.

18. The shaft seal assembly specified in claim 13 wherein said shaft seal includes an elastomeric material formed onto a reinforcing insert, said retainer engaging said shaft seal radially inward of said reinforcing insert.

19. The shaft seal assembly specified in claim 13 wherein said retainer includes a lubricant passage therein.

* * * * *